(12) United States Patent
Malewicz

(10) Patent No.: US 7,908,163 B2
(45) Date of Patent: Mar. 15, 2011

(54) METHOD AND SYSTEM FOR PARALLEL SCHEDULING OF COMPLEX DAGS UNDER UNCERTAINTY

(75) Inventor: Grzegorz Malewicz, Mountain View, CA (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 1158 days.

(21) Appl. No.: 11/458,030

(22) Filed: Jul. 17, 2006

(65) Prior Publication Data

US 2007/0067201 A1  Mar. 22, 2007

Related U.S. Application Data

(60) Provisional application No. 60/699,575, filed on Jul. 15, 2005.

(51) Int. Cl.
  G06F 9/46    (2006.01)
  G06F 15/02   (2006.01)
  G05B 19/418  (2006.01)
(52) U.S. Cl. ............................................... 705/9; 705/8
(58) Field of Classification Search .................. 705/9, 8
  See application file for complete search history.

(56) References Cited

U.S. PATENT DOCUMENTS

| | | | |
|---|---|---|---|
| 5,179,702 A | 1/1993 | Spix et al. | |
| 5,202,975 A | 4/1993 | Rasbold et al. | |
| 5,343,388 A | 8/1994 | Wedelin | |
| 5,386,562 A | 1/1995 | Jain et al. | |
| 5,742,821 A | 4/1998 | Prasanna | |
| 5,768,594 A | 6/1998 | Blelloch et al. | |
| 5,850,552 A | 12/1998 | Odani et al. | |
| 5,887,174 A | 3/1999 | Simons et al. | |
| 6,044,222 A | 3/2000 | Simons et al. | |
| 6,260,190 B1 | 7/2001 | Ju | |
| 6,434,590 B1 | 8/2002 | Blelloch et al. | |
| 6,957,202 B2* | 10/2005 | Skaanning et al. | 706/20 |
| 7,627,537 B2* | 12/2009 | Lai | 706/12 |
| 2006/0123009 A1* | 6/2006 | Bruno et al. | 707/10 |
| 2006/0218123 A1* | 9/2006 | Chowdhuri et al. | 707/2 |

OTHER PUBLICATIONS

Dandass, Yoginder. Generalizing List Scheduling for Stochastic Soft Real-Time Parallel Applications. Mississippi State University. Dec. 2003. p. 1-278.*

Fernandez, et al.; "Understanding Simulation Solutions to Resource Constrained Project Scheduling Problems with Stochastic Task Durations"; Engineering Management Journal; vol. 10; No. 4; 1998; pp. 5-13.

Fernandez, et al.; A Model for the Resource Constrained Project Scheduling Problem with Stochastic Task Durations; 7th Industrial Engineering Research Conference Proceedings; 1998.

(Continued)

*Primary Examiner* — Kambiz Abdi
*Assistant Examiner* — Jamie H Swartz
(74) *Attorney, Agent, or Firm* — Ballard Spahr LLP

(57) ABSTRACT

A methods and systems for addressing parallel scheduling problem where a directed acyclic graph (dag) modeling t tasks and their dependencies needs to be executed on n unreliable workers. The methods and systems determine how workers get assigned to tasks (possibly in parallel and redundantly) throughout execution, so as to minimize expected completion time. Disclosed is a polynomial time method for the problem restricted to the case when dag width is at most a constant and the number of workers is also at most a constant.

18 Claims, 9 Drawing Sheets

OTHER PUBLICATIONS

Goel, et al.; "Stochastic Load Balancing and Related Problems"; 40th Annual Symposium on Foundations of Computer Science (FOCS); 1999; pp. 579-586.

Mori, et al.; "A Resource Constrained Project Scheduling Problem with Reattempt at Failure: A Heuristic Approach"; Journal of the Operations Research Society of Japan; vol. 40; No. 1; 1997; pp. 33-44.

Narasimhan, et al.; "A Fast Approach to Computing Exact Solutions to the Resource-constrained Scheduling Problem"; ACM Transactions on Design Automation of Electronic Systems; vol. 6; No. 4; 2001; pp. 490-500.

Özdamar, et al.; A Survey on the Resource-Constrained Project Scheduling Problem; IIE Transactions; vol. 27; 1995; pp. 574-586.

Skutella, et al.; "Scheduling Precedence-constrained Jobs With Stochastic Processing Times on Parallel Machines"; 12th ACM-SIAM Symposium on Discrete Algorithms (SODA); 2001; pp. 589-590.

Tseng, et al.; "A Project Scheduling Model Considering the Success Probability"; Proceedings of the Association of Asian Pacific Operational Research Societies (APROS); 1994; pp. 399-406.

Turnquist, et al.; "Allocating Time and Resources in Project Management Under Uncertainty"; Proceedings of the 36th Annual Hawaii International Conference on System Science (HICSS); 2003; pp. 250.

* cited by examiner

FIG. 1a
FIG. 1b
FIG. 1c
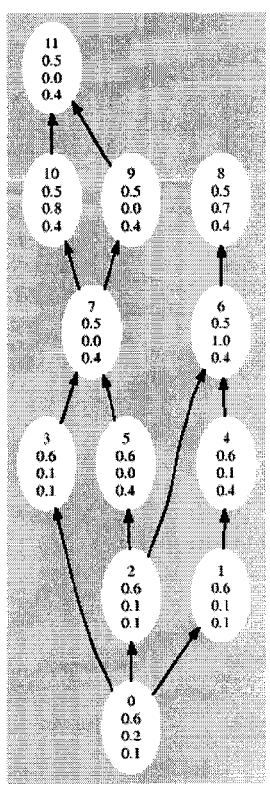
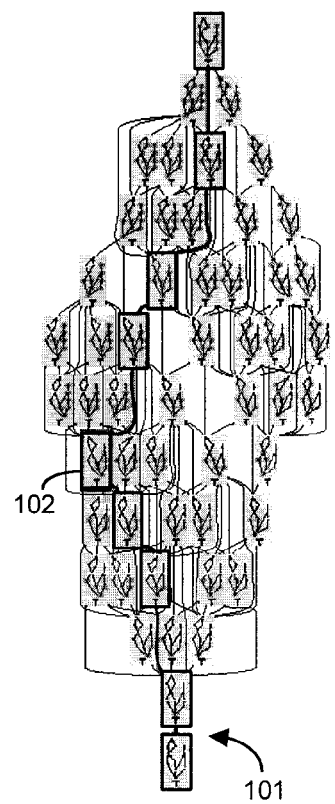
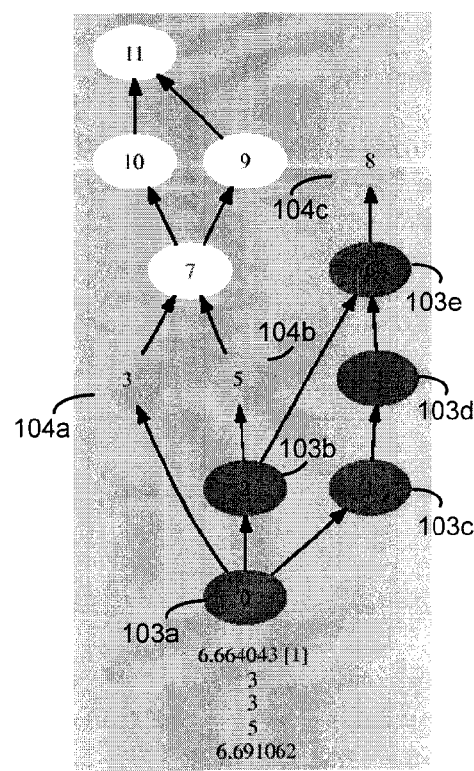

FIG. 5

Data structure: $T$ is a dictionary that maps nodes of $\mathcal{A}$ to distinct floating point variables

```
OPT(t, G, n, (p, j))                                    08      for all nonempty subsets D ⊆ I
01   let Y_1, ..., Y_m be a topological sort of A       09          let a = Pr[S executes exactly D]
02   T_{Y_m} = 0                                        10          sum = sum + a · T_{Y_h ∪ D}
03   for h = m - 1 downto 1 do                          11      let a = Pr[ every assigned worker fails ]
04       min = ∞                                        12      if (1 + sum)/(1 - a) < min
05       for all assignments S of workers to E(Y_h) ∪ {i}  13         min = (1 + sum)/(1 - a)
06           let I ⊆ E(Y_h) be the assigned tasks       14         Σ*(Y_h) = S
07           sum = 0                                    15  T_{Y_h} = min
```

FIG. 6

```
sum=0.0;
while( event <= ub ) {
    a = 1.0;
    hashYuD = hashYuSureD;
    bit = 1;
    for( j=0; j<i; ++j ) {
        if( event & bit ) {
            a *= notSureSuccProb[j];
            hashYuD += notSureV[j];
        }
        else
            a *= notSureFailProb[j];
        bit <<= 1;
    };
    hashYuD &= maskBS;
    slot1 = (hashYuD & maskS);
    slot2 = ((hashYuD * g[slot1]) % prime) & (maskB[slot1]);
    sum += a * (bucket[slot1])[slot2];
    event ++;
};
```

METHOD AND SYSTEM FOR PARALLEL SCHEDULING OF COMPLEX DAGS UNDER UNCERTAINTY

CROSS REFERENCE TO RELATED PATENT APPLICATIONS

This application claims priority to U.S. Provisional Application No. 60/699,575 filed Jul. 15, 2005, herein incorporated by reference in its entirety.

BACKGROUND

Grid computing infrastructures have been developed over the past several years to enable fast execution of computations using collections of distributed computers. Among the most important remaining challenges is to achieve efficiency of executing large-scale, sophisticated computations using unreliable computers. These problems are manifested, for example, in the Sloan Digital Sky Survey computations that have sophisticated task dependencies. When a computer fails to correctly execute an assigned task, then the progress of execution may be delayed because dependent tasks cannot be executed pending successful execution of the assigned task. It is conceivable that task dependencies and worker reliabilities play a significant role in the ability to execute a computation quickly. Therefore, one would like to determine relationships among these factors, and develop algorithms for quick execution of complex computations on unreliable computers.

A similar problem arises when managing projects such as production planning or software development. Here a collection of activities and precedence constraints are given. Workers can be assigned to perform the activities. In practice, a worker assigned to an activity may fail to perform it. For example, if an activity consists of writing a piece of code and testing it, it could happen that the test fails. The manager of the project may be able to estimate the success probability of a worker assigned to an activity based on prior experience with the worker. The manager may be able to redundantly assign workers to an activity. For example, two workers may independently write a piece of code and test it; if at least one test succeeds, the activity is completed. Thus the manager faces a problem of how to assign workers to activities, possibly in parallel and redundantly, over the course of the project, so as to minimize the total time of conducting the project.

SUMMARY

A method and system for addressing a parallel scheduling problem where a directed acyclic graph modeling t tasks and their dependencies needs to be executed on n unreliable workers. The system and method can efficiently find an optimal regimen when dag width is at most a constant and the number of workers is also at most a constant. Worker i executes task j correctly with probability $p_{i,j}$. Each attempt at executing a task takes a unit of time. The goal is to find a regimen $\Sigma^*$, that dictates how workers get assigned to tasks (possibly in parallel and redundantly) throughout execution, so as to minimize expected completion time. This fundamental parallel scheduling problem arises in grid computing and project management fields, and has several practical applications, for example, to reduce completion time of executing complex dags using unreliable workers.

Additional advantages of the invention will be set forth in part in the description which follows, and in part will be obvious from the description, or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIGS. 1 a, b, and c illustrate an exemplary scheduling problem and an optimal solution.

FIG. 5 is pseudocode for constructing an optimal regimen $\Sigma^*$, for a dag G describing dependencies among t tasks, and n workers such that worker i executes task j successfully with probability $p_{i,j}$.

FIG. 6 is an exemplary C++ implementation of an inner loop of the method of the present invention.

DETAILED DESCRIPTION

Figure 2:
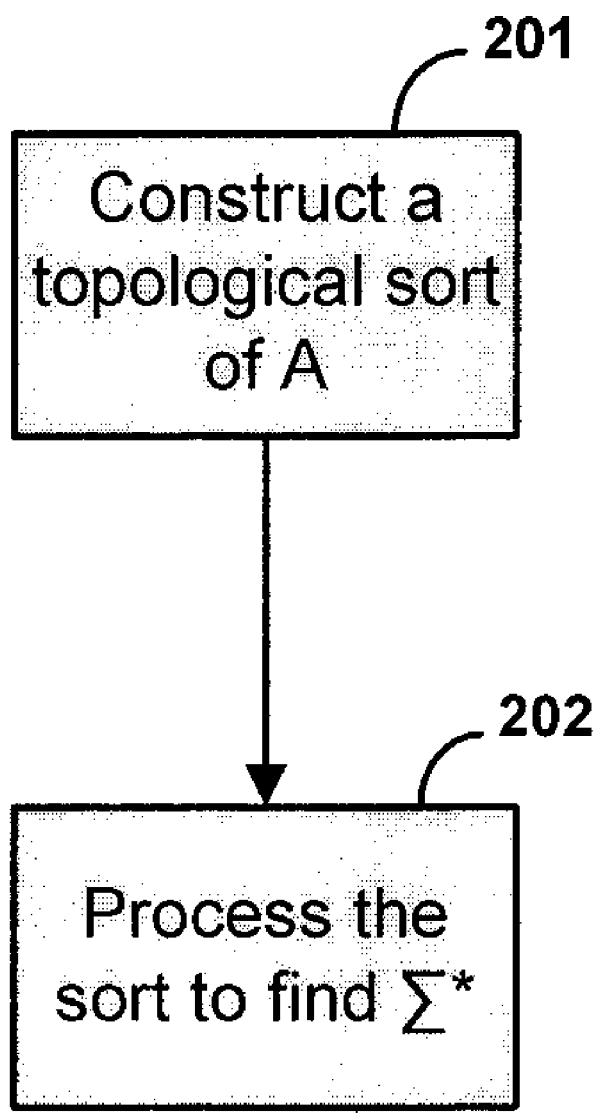
FIG. 2 is a flow diagram illustrating an exemplary method.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "a worker" includes mixtures of workers, reference to "a worker" includes mixtures of two or more such workers, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments of the methods and systems and the Examples included therein and to the Figures and their previous and following description.

I. GENERAL

The methods and systems provided can determine an optimal regimen when dag width is at most a constant and the number of workers is also at most a constant. These two restrictions are fundamentally required. The problem is NP-hard with constant number of workers when dag width can grow, and is also NP-hard with a constant dag width when the number of workers can grow. When both dag width and the number of workers are unconstrained, then the problem is inapproximable within factor less than 5/4, unless P=NP.

An exemplary parallel scheduling problem that can be addressed by the method disclosed herein is as follows, a directed acyclic graph (dag) is given representing t tasks and their dependencies. There are n workers. At any given unit of time, workers are assigned in some way to the tasks that are "eligible" based on precedence constraints and tasks executed thus far (workers can be assigned to more than one task but any worker is assigned to a single task; more than one worker can be assigned to a task; workers can idle). The workers then attempt to execute the assigned tasks. The attempt of worker i to execute task j succeeds with probability $0 \leq p_{i,j} \leq 1$. In the next unit of time workers are again assigned to tasks. The execution proceeds in this manner until all tasks have been executed. The goal is to determine a regimen $\Sigma$ that dictates how workers get assigned to tasks throughout execution so as to minimize the expected completion time.

FIG. 1(a) illustrates a dag of task dependencies, and the probabilities of success of workers. Enumerate all subsets $Y_1, \ldots, Y_m$ of tasks that satisfy precedence constraints, and determine pairs of subsets such that $Y_j$ can be obtained from $Y_i$ by executing some eligible tasks in $Y_i$. These subsets and the "obtainability" relation form a dag, referred to as an admissible evolution of execution, denoted A (see FIG. 1(b)). The expected time to completion of a regimen starting with tasks Y already executed depends recursively on expectations when starting with the subsets that are the children of Y and A. The expectation can be found with a dynamic programming approach. Process a topological sort of A in reverse order. When processing a subset Y, consider all ways in which workers can be assigned to eligible tasks or can idle, and pick one that minimizes expectation (according to a recursive equation). After the sort has been processed, the resulting regimen $\Sigma^*$, minimizes expected completion time (see FIGS. 1(b) and (c)).

FIGS. 1a, b, and c illustrate an instance of the scheduling problem and an optimal solution. FIG. 1(a) shows 12 dependent tasks with 3 workers and probabilities of success and FIG. 1(b) admissible evolution of execution listing, for each node, the minimum expected time to completion and a corresponding assignment of workers. FIG. 1(c) shows a set of executed tasks (103a, b, c, d, e) and the resulting eligible tasks (104a, b, c). The minimum expected time to completion is 6.664043; worker assignment is one to 3, two to 3, three to 5. For any other assignment, expectation is at least 6.69. This set can be encountered during execution (the frame 102 on the path of frames 101 in FIG. 1(b)).

A goal of stochastic scheduling is to minimize the expected completion time when task durations are random variables and tasks need to be scheduled on parallel machines. See Skutella, M., Uetz, M.: Stochastic Machine Scheduling with Precedence Constraints. SIAM Journal on Computing, Vol. 34(4) (2005) 788-802. Assuming two or more machines may be assigned to the same task can modify the probability distribution of task duration.

The disclosed methods can utilize a perfect hash function that maps subsets of integers to integers. The most well-know perfect hash function mapping integers to integers is described in Fredman, et al., Storing a sparse table with O(1) worst case access time, Journal of the ACM, Vol. 31(3) (1984) 538-544, which is herein incorporated by reference in it entirety for its teachings regarding perfect hash functions. The perfect hash function of the disclosed method can utilize sets of keys. The sets of keys can comprise substrings of arbitrary strings of zeros and ones. A trie data structure can be used in the disclosed methods to map to a distinct integer any subset of integers from a collection of subsets. However, the use of a trie instead of a hash table in the inner loop can increase the running time for dags of width larger than the number of workers. For a discussion of trie data structures, see Knuth, D. E.: The Art of Computer Programming, Volume 3, Second Edition. Addison-Wesley (1998), which is herein incorporated by reference in it entirety for its teachings regarding trie data structures.

II. DAG OVERVIEW

A directed graph G can be given by a set of nodes $N_G$ and a set of arcs (or, directed edges) $A_G$, each having the form $(u \rightarrow v)$, where $u, v \in N_G$. A path in G can be a sequence of arcs that share adjacent endpoints, as in the following path from node $u_1$ to node $u_k$: $(u_1 \rightarrow u_2), (u_2 \rightarrow u_3), \ldots, (u_{k-2} \rightarrow u_{k-1}), (u_{k-1} \rightarrow u_k)$. A dag (directed acyclic graph) G is a directed graph that has no cycles; i.e., in a dag, no path of the preceding form has $u_1 = u_k$. Given an arc $(u \rightarrow v) \in A_G$, u is a parent of v, and v is a child of u in G. Each parentless node of G is a source (node), and each childless node is a sink (node); all other nodes are internal.

Given a dag, an antichain is a set of its nodes such that no two are "comparable" i.e., for any two distinct nodes u and v from the set, there is no path from u to v nor from v to u. The largest cardinality of an antichain is called width of the dag. A chain is a path. A set of chains is said to cover the dag if every node of the dag is a node in at least one of the chains (chains may "overlap"). A Dilworth Theorem states that dag width is equal to the minimum number of chains that cover the dag.

A computation can be modeled by a dag. Then the nodes are called tasks and for concreteness assume that $N_G = \{1, \ldots, t\}$. Denote a set $\{1, \ldots, t\}$ by $[t]$. Arcs specify dependencies between tasks: given an arc $(u \rightarrow v)$, v cannot be executed until u has been. A set of tasks satisfies precedence constraints if, for every task in the set, all parents of the task are also in the set. Given such set X, denote the set of tasks not in X all whose parents are in X by E(X); tasks in this set are called eligible when tasks X have been executed. (So any source not in X is eligible.)

The execution of tasks can be modeled by the following game. There are n workers identified with elements of [n]. Let X be a set of tasks that satisfies precedence constraints. The game starts with Y=X, and proceeds in rounds. During a round, workers are assigned to tasks in E(Y) according to a regimen $\Sigma$. The regimen specifies an assignment $\Sigma(Y)$ that maps each worker to an element of the set $E(Y) \cup \{\bot\}$ i.e., either to a task that is eligible in this round, or to a distinguished element $\bot$. Note that the assignment is determined by the set of tasks Y. The assignment enables directing multiple workers to the same task, or to different tasks; workers can also idle. Then each worker that was assigned to a task attempts to execute the task. The attempt of worker i assigned to task j succeeds with probability $0 \leq p_{i,j} \leq 1$ independently of any other attempts. Assume that there is at least one worker that has non-zero probability of success, for any given task. A task is executed in this round if, and only if, at least one worker assigned to the task has succeeded. All executed tasks are added to Y, and the game proceeds to the next round. It could be the case that all attempts have failed; then the set Y remains unchanged, and in the next round worker assignment remains unchanged. Formally, a regimen $\Sigma$ is a function $\Sigma:2^{N_G} \rightarrow ([n] \rightarrow (N_G \cup \{\bot\}))$, such that for any subset Z of tasks that satisfies precedence constraints, the value $\Sigma(Z)$ is a function from [n] to the set $E(Z) \cup \{\bot\}$. The game proceeds until a round when all sinks of G are in Y. The game ends in such round.

The quality of the game can be determined by how quickly the game ends. Specifically, the number of rounds of the game, beyond the first round, until the round when the game ends is called time to completion of regimen $\Sigma$ starting with tasks X already executed. This time is a random variable. When X is empty, the time can be referred to as completion time. A goal is to find a regimen $\Sigma^*$ that minimizes the expected completion time. This goal can be referred to as the Recomputation and Overbooking allowed Probabilistic dAg Scheduling Problem (ROPAS).

ROPAS

Instance: A dag G describing dependencies between t tasks, n workers such that worker i succeeds in executing task j with probability $0 \leq p_{i,j} \leq 1$, and that for any j there is i so that $p_{i,j} > 0$.

Objective. Find a regimen $\Sigma^*$ that minimizes the expected completion time.

Observe that the optimization problem yields a finite expectation. Let X be a subset of tasks that satisfies precedence constraints. Denote by $B_X$ the minimum expected time to completion across all regimens that start with tasks X already executed. It can be shown that $B_X$ is finite.

III. HASH FUNCTION BACKGROUND

What follows is a summary of relevant background on hash functions. Given two sets A and B, a family of hash functions (transformations) from A to B is called c-universal, if for any distinct x, y$\in$A, at most a c/|B| fraction of the hash functions map x and y to the same element of B. If a family is 1-universal, it is called universal. The disclosed method can use three families of hash functions. Any hash function from the first two families maps any subset of [t] to an integer. The families differ by the range of their hash functions. Let r, s$\geq$1 be fixed integers. Hash functions are indexed by vectors v of length t with coordinates from $V = \{0, \ldots, r \cdot s - 1\}$. For the first family F, each hash functions $f_v$ maps any subset to an element of $V = \{0, \ldots, r \cdot s - 1\}$ as prescribed by $f_v(Y) = (\Sigma_{i \in Y} v_i \mod r \cdot s)$. For the second family F', each hash function $f'_v$ maps any subset to an element of $V' = \{0, \ldots, s-1\}$ as prescribed by $f'_v(Y) = (\Sigma_{i \in Y} v_i \mod s)$. Note that $f'_v(Y) = (f_v(Y) \mod s)$. The third family F" comprises hash functions that map integers to integers. Let p be a prime number at least r·s, and $1 \leq b \leq p$. Hash functions from F" are indexed by numbers g from $\{0, \ldots, p-1\}$. A hash function $f''_g$ maps elements of V to elements of $\{0, \ldots, b-1\}$ and is defined as $f''_g(x) = ((g \cdot x \mod p) \mod b)$.

Theorem 2.1 The families F and F' are universal and the family F" is 2-universal.

Universal hash functions have the ability to avoid "collisions" that are essentially due to Fredman, et al., E.: Storing a sparse table with O(1) worst case access time, Journal of the ACM, Vol. 31(3) (1984) 538-544, herein incorporated by reference in its entirety for its teachings of and related to universal hash functions.

Theorem 2.2 Fix a c-universal family of hash functions from A to B, such that B has cardinality at least $d \cdot m^2$, and fix a subset of A of cardinality m. Then at least a (1−c/(2d)) fraction of the functions map the elements of the subset to distinct elements of B.

Theorem 2.3 Fix a universal family of hash functions from A to B, and a subset of A of cardinality at most |B|. For a given function, let $c_i$ be the number of elements of the subset mapped by the function to i$\in$B. Then at least half of the functions have the property that $\Sigma_{i \in B} c_i^2 \leq 4|B|$.

III. METHODS

This section discloses a method for solving ROPAS. The method can find an optimal regimen using a dynamic programming approach as an example. This approach is possible because of two key properties of the problem: (1) expectations can be related recursively, and (2) problem structure enables effective evaluation of the recurrence. The first property can be described as follows, consider a set of tasks X that are already executed. Then tasks E(X) are eligible and a regimen assigns some workers to some of these tasks. Consider all $D_1, \ldots, D_k$ non-empty subsets of E(X), and compute the probability that exactly the tasks from $D_i$ are executed by the regimen in this assignment. Then evaluate the expected time to completion of the regimen when it starts with tasks $X \cup D_i$ already executed. The former expectation is related in a recursive manner to the latter expectations as stated in the subsequent lemma.

Lemma 3.1 Consider a regimen $\Sigma$ and a set X of tasks that satisfies precedence constraints and does not contain all sinks of G. Let $D_0, D_1, \ldots, D_k$ be all the distinct subsets of E(X), and $D_0 = \emptyset$. Let $a_i$ be the probability that $D_i$ is exactly the set of tasks executed by workers in the assignment $\Sigma(X)$. Let $X_i = X \cup D_i$. Then $$T_{X_0} = \frac{1}{a_1 + \ldots + a_k}\left(1 + \sum_{i=1}^{k} a_i \cdot T_{X_i}\right),$$

where $T_{X_i}$ is the expected time to completion for regimen $\Sigma$ starting with tasks $X_i$ already executed (the division by zero or an addition of infinity makes $T_{X_0}$ infinite).

The second key property is that the dependencies exposed in the lemma have a structure of a directed acyclic graph. This means the evaluation of the recurrence can be sequenced. Construct a directed graph $A = (N_A, A_A)$ called admissible evolution of execution for G. The construction is inductive. Each node of A can be a subset of nodes of G. Begin with a set $N_A = \{\emptyset\}$. For any node $X \in N_A$ that does not contain all sinks of G, calculate the set of eligible tasks E(X) in G. Then take all non-empty subsets $D \subset E(X)$, add to $N_A$ a node $X \cup D$, if it is not already there, and add to $A_A$ an arc $(X, X \cup D)$, if it is not already there. Since G is finite, the inductive process clearly defines a unique directed graph A. The structure of this graph is explained in the subsequent lemma.

Lemma 3.2 Let A be the admissible evolution of execution for a dag G. Then A is dag. Its nodes are exactly the sets of tasks that satisfy precedence constraints. The dag A has a single source $\emptyset$ and a single sink $N_G$.

Disclosed herein is a method referred to as OPT, or OPTimal, that defines a regimen called $\Sigma^*$ (a pseudocode is given in FIG. 5). Since A has no cycles, apply the recurrence of Lemma 3.1 starting from the sink and backtracking towards the source. In particular, initialize the regimen arbitrarily. Then take a topological sort $Y_1, \ldots, Y_m$ of A and process it in the reverse order of the sort. When processing a node X of A, define two values: a number $T_X$ and an assignment $\Sigma^*(X)$.

Begin by setting $T_{Y_m}$ to 0, and $\Sigma^*(Y_m)$ so that each worker is assigned to $\bot$. Now let $1 \leq h < m$. $T_{Y_h}$ and $\Sigma^*(Y_h)$ are defined as follows. Let $D_0, \ldots, D_k$ be all the distinct subsets of $E(Y_h)$, such that $D_0 = \emptyset$. Consider all possible $(|E(Y_h)|+1)^n$ assignments of the n workers to the tasks of $E(Y_h)$ or to $\bot$. For any assignment, calculate the probability $a_i$ that $D_i$ is exactly the set of tasks executed by workers in the assignment. If $a_1 + \ldots + a_k > 0$, then compute the weighted sum $$1/(a_1 + \ldots + a_k) \cdot \left(1 + \sum_{i=1}^{k} a_i \cdot T_{Y_h \cup D_i}\right).$$

Select an assignment that minimizes the sum. Set $T_{Y_h}$ to the minimum, and $\Sigma^*(Y_h)$ to the assignment that achieves the minimum. Then move back in the topological sort to process another node, by decreasing h. After the entire sort has been processed, the regimen $\Sigma^*$ has been determined. The following theorem summarizes the properties of the regimen $\Sigma^*$ found by the algorithm.

Theorem 3.3 When the algorithm OPT halts, then for any set X of tasks that satisfies precedence constraints, the expected time to completion for regimen $\Sigma^*$ starting with tasks X already executed is equal to the minimum expected time to completion $B_X$ that any regimen can achieve starting with tasks X already executed.

If G has constant width, then A has the number of nodes that is polynomially bounded by the size of G. When the number of workers is constant, then when processing any node of A, there are at most polynomially many ways in which workers could be assigned to eligible tasks, and for each way there is a constant number of sets $D_i$ whose probability of being executed is non-zero. This gives rise to the following theorem.

Theorem 3.4 The algorithm OPT solves the ROPAS Problem in polynomial time when width of G is bounded by a constant and the number of workers is also bounded by a constant.

Theorem 3.5 The ROPAS Problem restricted to the dag with two independent tasks (where the number of workers may grow) is NP-hard. The problem is also NP-hard when restricted to two workers (where the dag width may grow).

Intuitively, the former hardness results from the difficulty to perfectly load balance many unreliable workers across eligible tasks, while the latter hardness is a consequence of possibly many complex task dependencies which make it difficult to determine how to assign tasks for execution to two workers so that sufficiently many tasks become eligible thus preventing workers from compulsory idling.

A topological sort of the dag A of admissible evolution of execution can be constructed for G by listing subsets of executed tasks in the order of increasing cardinalities of the subsets. t+1 expansible hash tables $H_0, H_1, \ldots, H_t$ can be used. Table $H_i$ can store subsets of cardinality i. Each subset X can be assigned a key $\Sigma_{i \in X} v_i$, where the $v_i$ are pseudorandomly preselected 32-bit integers. The definition of keys typically ensures lack of collisions of keys, and a fairly uniform distribution of keys taken modulo any 32-bit number, which is important when growing $H_i$. Table $H_i$ can be implemented using collision resolution by chaining. Each entry can be a key-subset pair. When inserting a key-subset pair, search the list corresponding to the key, and only when a pair with the same key is found, are the subsets compared. This accelerates detection of duplicates because key comparison is quicker than comparison of subsets. Grow the table by the factor of 2 upon inserting a unique subset exceeding the size of the table. Then key-subset pairs are rehashed. This approach helps maintain short lists.

Begin by inserting an empty subset into $H_0$. Then proceed inductively. Assume that all distinct subsets of size i that satisfy precedence constraints reside in $H_i$. Next is shown how to produce $H_{i+1}$. Enumerate subsets from $H_i$, and for each such subset X, mark as executed every its eligible task in turn, and add the resulting subsets to $H_{i+1}$ whenever the subset is not yet in $H_{i+1}$. Each subset can be represented as a vector of the number of unexecuted parents of nodes of G, since it helps determine eligible tasks. The enumeration yields $H_{i+1}$ with all distinct subsets of cardinality i+1.

The sequence of subsets obtained by first listing subsets from $H_0$, then from $H_1$, and so on is a topological sort of A, because any arc of A points from a subset to a subset of strictly larger cardinality.

Figure 3:
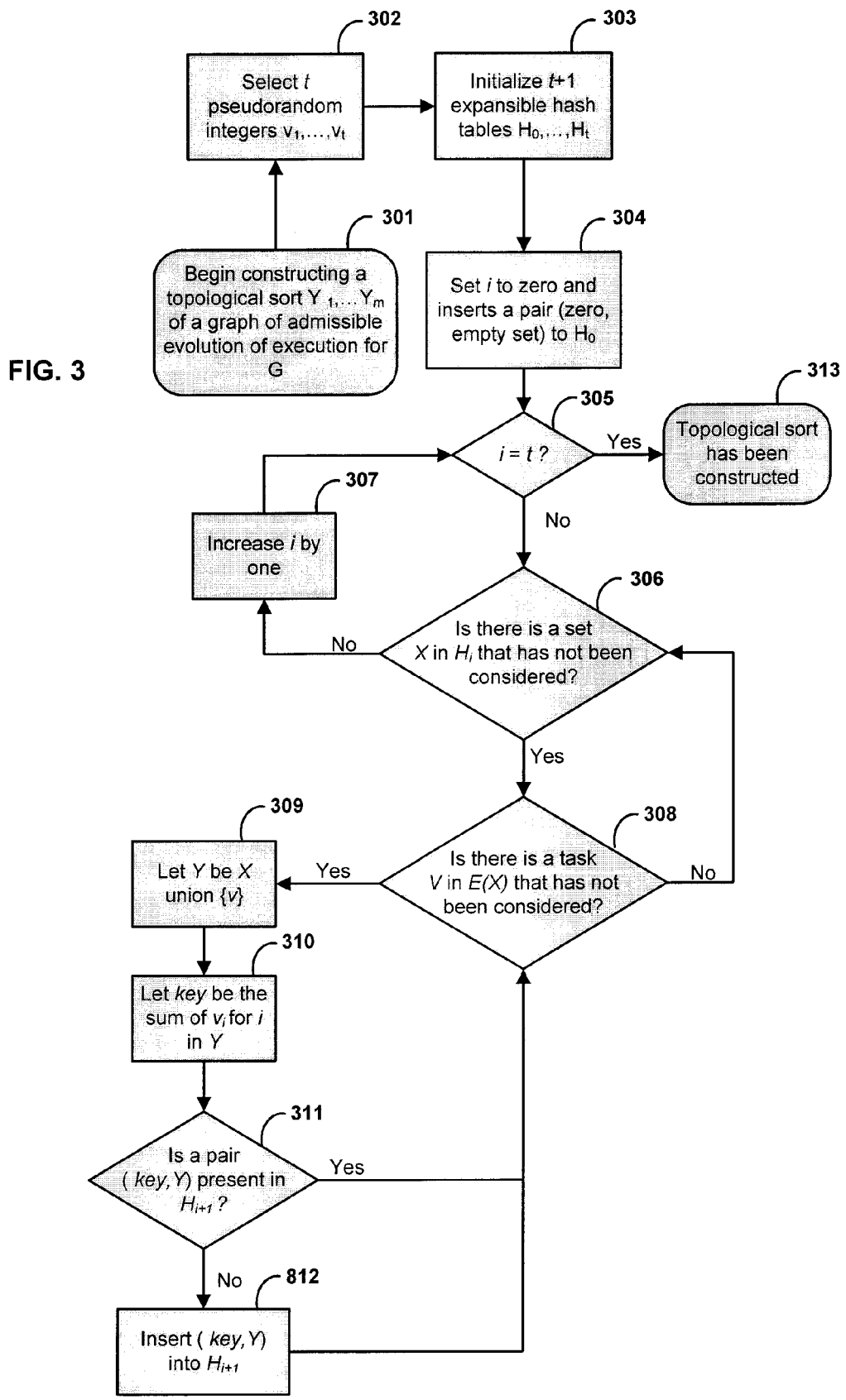
FIG. 3 is a flow diagram illustrating construction of a topological sort.

By way of example, the method can be implemented in two phases as indicated in FIG. 2: constructing a topological sort (block 201) and constructing an optimal regimen $\Sigma^*$ (block 202). The optimal regimen, or optimal assignment of workers to tasks, can be determined at any stage of the execution of the tasks from the topological sort. The first phase is illustrated in FIG. 3. The method begins constructing a topological sort $Y_1, \ldots Y_m$ of a graph of admissible evolution of execution for G (block 301). The method selects t pseudorandom integers $v_1, \ldots, v_t$ (block 302), then initializes t+1 expansible hash tables $H_0, \ldots, H_t$ (block 303). The method sets i to zero and inserts a pair (zero, empty set) to $H_0$ (block 304). The method performs a check to determine if i=t (block 305). If, at block 305, i is equal to t, then the topological sort has been constructed (block 313). If, at block 305, i is not equal to t, the method performs a check to determine if there is a set X in $H_i$ that has not been considered (block 306). If there is no set X that has not been considered, the method will increase i by one (block 307) and return to block 305 to determine if i=t. If, at block 306, there is a set X in $H_i$ that has not been considered, the method will perform a check to determine if there is a task v in E(A) that has not been considered (block 308). If, at block 308, there is no task v that has not been considered, the method will move to block 306. If, at block 308, there is a task v in E(X) that has not been considered, the method will let Y be X union $\{v\}$ (block 309). The method will then proceed to block 310 and let key be the sum of $v_i$ for i in Y. Then, at block 311, a check is performed to determine if a pair (key, Y) is present in $H_{i+1}$. If a pair (key, Y) is present in $H_{i+1}$ the method returns to block 308. If a pair (key, Y) is not present in $H_{i+1}$ the method will insert (key, Y) into $H_{i+1}$ (block 312) and return to block 308. Once the method has traversed to block 313 and the topological sort has been constructed, the method enters the next phase.

Figure 4:
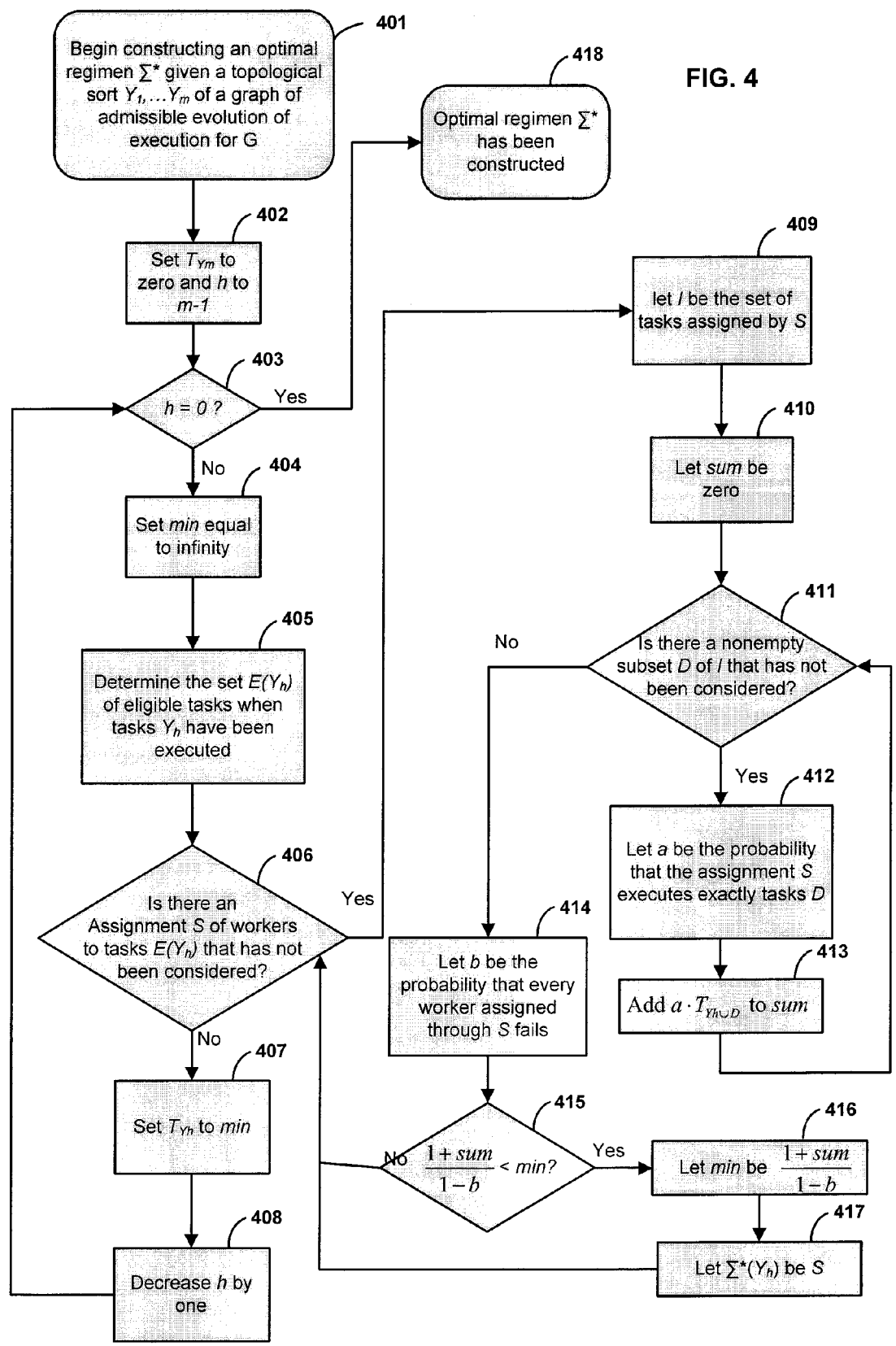
FIG. 4 is a flow diagram illustrating construction of an optimal regimen $\Sigma^*$.

The next phase of the method is constructing an optimal regimen $\Sigma^*$ and is illustrated in FIG. 4. The method begins constructing an optimal regimen $\Sigma^*$ given a topological sort $Y_1, \ldots Y_m$ of a graph of admissible evolution of execution for G (block 401). The method sets $T_{Y_m}$ to zero and h to m-1 (block 402). The method performs a check at block 403 to determine if h=0. If h is equal to 0, the optimal regimen $\Sigma^*$ has been constructed (block 418) and the method is complete. If h is not equal to 0, the method sets min equal to infinity (block 404) and determines the set $E(Y_h)$ of eligible tasks when tasks $Y_h$ have been executed (block 405). The method then performs a check to determine if there is an assignment S of workers to tasks $E(Y_h)$ that has not been considered (block 406). If, at block 406, there is not an assignment S of workers to tasks $E(Y_h)$ that has not been considered, the method will set $T_{Y_h}$ to min (block 407) and decrease h by one (block 408).

The method then returns to the check at block 403. If, at block 406, there is an assignment S of workers to tasks $E(Y_h)$ that has not been considered, the method will let I be the set of tasks assigned by S (block 409) and let sum be zero (block 410). The method will then perform a check to determine if there is a nonempty subset D of I that has not been considered (block 411). If, at block 411, there is a nonempty subset D of I that has not been considered, the method will let a be the probability that the assignment S executes exactly tasks D (block 412) and adds $a \cdot T_{Y_h \cup D}$ to sum (block 413) and returns to block 411. If, at block 411, there is no nonempty subset D of I that has not been considered, the method will let b be the probability that every worker assigned through S fails (block 414). The method will then perform a check to determine if $$\frac{1 + \text{sum}}{1 + b} < \min \text{(block 415)}.$$

If, at block 415, $$\frac{1 + \text{sum}}{1 - b} < \min \text{ is true,}$$

the method will let $$\min \text{ be } \frac{1 + \text{sum}}{1 - b} \text{(block 416)}$$

and let $\Sigma^*(Y_h)$ be S (block 417). The method then returns to block 406. If, at block 415, $$\frac{1 + \text{sum}}{1 - b} < \min$$

is not true, the method returns to block 406. Once the method has traversed to block 418, an optimal regimen $\Sigma^*$ has been constructed and the method is complete.

IV. EFFICIENT METHOD IMPLEMENTATION

Described below is a system that implements the method efficiently.

OPT has two phases: construct a topological sort of A, and then process the sort to find $\Sigma^*$. The first phase can be accomplished quickly with the help of a dynamic perfect hash table. It is the second phase, however, that requires most time to run, because of the triple nested loops in lines 03 to 15 of FIG. 5 and dictionary accesses in the inner loop. Therefore, what follows a method for implementing these loops. FIG. 5 is an algorithm for constructing an optimal regimen $\Sigma^*$, for a dag G describing dependencies among t tasks, and n workers such that worker i executes task j successfully with probability $p_{i,j}$. The number of iterations of the outer loop is fixed to m−1. Hence, the goal is to keep the number of iterations of the middle and inner loop low, and also keep low the running time of the body of the inner loop.

It is possible to reduce the number of iterations of the middle loop. Do not consider any assignment S that assigns a worker to ⊥, because an optimal assignment can assign every available worker to an eligible task. This reduces the number of middle loop iterations from $(|E(Y_h)|+1)^n$ to $(|E(Y_h)|)^n$. For example, when there are 7 workers and 7 eligible tasks, reduce the number of iterations by at least factor ⅖. The gain gets amplified when the number of workers grows with $|E(Y_h)|$ fixed.

The number of iterations of the inner loop can be reduced. Here determine which tasks must be executed and which cannot be through S, and only consider the sets D that do not contain such tasks.

The final improvement is to implement the body of the inner loop well. Here the main cost appears to be the dictionary lookup $T_{Y_h \cup D}$, where $Y_h \cup D$ is a subset of nodes of G. The lookups can be accomplished quickly when a carefully crafted perfect hash table is used, so that the lookup time is on the order of the cardinality of D, rather than the cardinality of $Y_h \cup D$, the latter of which may be quite large, while the former may be fairly small. The key idea is to use a "linear" hash function $f$ so that $f(Y_h)$ can be precomputed, and then only compute $f(D)$ inside the body.

Described Below are Detailed Descriptions of Improvements in Turn.

A. Reducing the Number of Iterations of the Middle Loop

This section explains why it is sufficient to consider only assignments S that assign every worker to a task, but not to ⊥, when searching for an optimal $\Sigma^*$ in the middle loop in lines 05 to 14 of FIG. 5. Begin by observing that, roughly speaking, "more done, less time remaining to complete", as detailed in the subsequent lemma.

Lemma 4.1. For any subsets $X \subset Y$ of tasks that satisfy precedence constraints, $B_X \geq B_Y$.

The lemma holds that when processing $Y_h$, it is sufficient to consider assignments S that map every worker to an eligible task, because an assignment that yields the minimum time to completion $B_{Y_h}$ will be found.

Theorem 4.2. For any set X of tasks that satisfies precedence constraints and does not contain all sinks of G, there is a regimen $\Sigma$ such that $\Sigma(X)$ assigns every worker to a task of E(X) and the expected time to completion of $\Sigma$ that starts with tasks X already executed is $B_X$ (i.e., minimum).

Corollary 4.3. A modified algorithm OPT that considers in line 05 only the assignments S that map each worker to a task solves ROPICO.

B. Reducing the Number of Iterations of the Inner Loop

It is possible to reduce the number of iterations of the inner loop when the structure of the probabilities $p_{i,j}$ is favorable. The inner loop begins with a set I of eligible tasks to which at least one worker was assigned by S, and considers all nonempty subsets D of I. Thus it considers $2^{|I|}-1$ sets D. This number can sometimes be reduced. Compute the probability $q_j$ that every worker assigned to j fails, just by multiplying out $1-p_{i,j}$ across workers i assigned to j. Then focus on a set I' of tasks j such that $0<q_j<1$. It is sufficient to consider only subsets $D' \subset I'$ instead of subsets $D \subset I$. However, include the empty subset as D' when there is a task in I that is certainly executed. If there is no such task, then omit the empty D' from consideration. Combine, inside the body of the inner loop, the subset D' with tasks j for which $q_j=1$. In some applications it may be the case that $0<P_{i,j}<1$ for all workers and tasks. Then the approach described here could be removed from the implementation.

C. Implementation of the Body of the Inner Loop

The body of the inner loop of lines 09 and 10 of FIG. 5, is the most frequently executed piece of code when constructing $\Sigma^*$. The main objective is to ensure that the dictionary lookup of line 10 takes time proportional to the cardinality of the set I', and not the cardinality of $Y_h \cup D$. By way of example, this can be achieved by engineering a perfect hash table using a "linear" hash function.

What follows is an outline of a design of a two-level perfect hash table. Use the family F of hash functions to find a functions $f_v$ that maps the sets $Y_1, \ldots, Y_m$ to distinct numbers from $\{0, \ldots, rs-1\}$—s is the smallest power of 2 that is at least m, and r=2s—and the family F' to find $f'_v$ that maps the numbers to buckets of total squares of sizes linear in s. Theorems 2.3 and 2.2 ensure that a desired v can be found. Note that the fact that s is a power of 2 and so is r simplifies the computation of (x mod s) and also (x mod rs), since there is merely a need to take a logical "and" of x with appropriate masks. Construct the second level hash table using the family F''. Pick $b_i$ as the smallest power of 2 at least $2 \cdot c_i^2$, and p as the smallest prime at least $b_i$, for any i, and at least rs. By Theorem 2.2, select $g_i$, from $\{0, \ldots, p-1\}$ to obtain $f_{g_i}''(x)=(g_i x \bmod b_i)$ that distributes content of the bucket i into distinct slots of the second level hash table.

The body of the inner loop can be implemented as follows. Note that the hash function $f_v$ is linear in the sense that for disjoint X and Y, $f_v(X \cup Y)$ is equal to $(f_v(X)+f_v(Y))$ mod rs. This fact can be used to reduce the amount of computation inside the loop. Before beginning the inner loop, compute $f_v(Y_h \cup \text{sureD})$, where sureD contains the tasks from I that are certainly executed in this assignment S (these whose $q_j=0$). The loop now considers all subsets D' of I' (excluding the empty one when sureD is empty). For a given subset D', the value $f_v(D')$ is computed, then the value of $f_v(Y_h \cup \text{sureD} \cup D')$ is computed using linearity, and from this the slot in the first level hash table and then the slot in the second level hash table are determined. Compute the probability a that a given D=sureD$\cup$D' considered within the body will be executed by S. This computation can be accelerated using a scratch table that for any given task j from I' contains the probability $1-q_j$ that this task will be executed, and another scratch table containing the probability $q_j$ that this task will not be executed. FIG. 6 is an exemplary C++ implementation of the inner loop. The variables used in the code are initialized as follows: event to 0 when sureD is not empty, and to 1 when sureD is empty; ub to $2^{|I'|}-1$; hashYuSureD to $h_v(Y_h \cup \text{sureD})$; i to |I'|; maskRS to r·s−1; maskS to s−1; prime top; maskB[ ] to the table containing the $b_i$; g[ ] to the table containing the $g_i$; bucket[ ] to a table of pointers to the second level tables of floating point numbers. The set I' is assumed to be I'= $\{i'_0, i'_1, \ldots, i'_{|I'|-1}\}$. Then the tables are initialized as follows: notSureSuccProbb[j] to $1-q_{i'_j}$; notSureFailProb[j] to $q_{i'_j}$; notSureV[j] to $v_{i'_j}$.

Note that the probability a and the value $f_v(Y_h \cup \text{sureD} \cup D')$ could be computed "incrementally" from their values from the previous iteration. However, it may lead to the accumulation of numerical errors and a more complex control structure.

D. Prediction of Running Time

The running time of the disclosed implementation may be quite sensitive to certain features of the problem instance on which the implementation runs. In particular, the running time grows exponentially with graph width and the number of workers. Thus small changes in these numbers could create time differences between days and months. One would like to determine the running time before the outer loop runs, so as to decide if the implementation will halt within the available amount of time. Therefore, provided is a formula that predicts the running time of the outer loop.

The running time of the outer loop appears to be related to the total number U of iterations of the body of the inner loop. Then derive an exact formula for U. Assume that $0<p_{i,j}<1$, so that the set I of line 06 of tasks to which workers are assigned and the set I' considered in the inner loop are the same. The value of U without this assumption is clearly bounded from above by the value with the assumption. Let $e_h$ denote the cardinality of the set $E(Y_h)$. Suppose that a set $Y=Y_h$ is being considered in line 05 that creates $e=e_h \geq 1$ eligible tasks. Compute the resulting number u(e, n) of iterations of the inner loop:

$$u(e, n) = \sum_{i=1}^{\min\{n,e\}} \binom{e}{i} \cdot W(n, i) \cdot (2^i - 1),$$

where W(n, i) is the number of assignments that map n workers to i tasks, which can be expressed recursively as: W(n, 1)=1, when $n \geq 1$; W(n, i)=0, when n<i; W(n, i)=i·(W(n−1, i−1)+W(n−1, i)), when $n \geq i \geq 2$.

Theorem 5.1. The total number of iterations of the inner loop is $$U = \sum_{h=1}^{m-1} u(e_h, n),$$

when $0<p_{i,j}<1$.

The formula for U can be used to predict the running time of the outer loop. Account for the running time of each iteration of the inner loop, about i, and thus define an expression $$v(e, n) = \sum_{i=1}^{\min\{n,e\}} i \cdot \binom{e}{i} \cdot W(n, i) \cdot (2^i - 1).$$

An estimate is then defined as $$est = \sum_{h=1}^{m-1} v(e_h, n).$$

In order to find the predicted running time, multiply est by a hardware-specific constant γ that can be established experimentally.

V. EXEMPLARY OPERATING ENVIRONMENT

Figure 7:
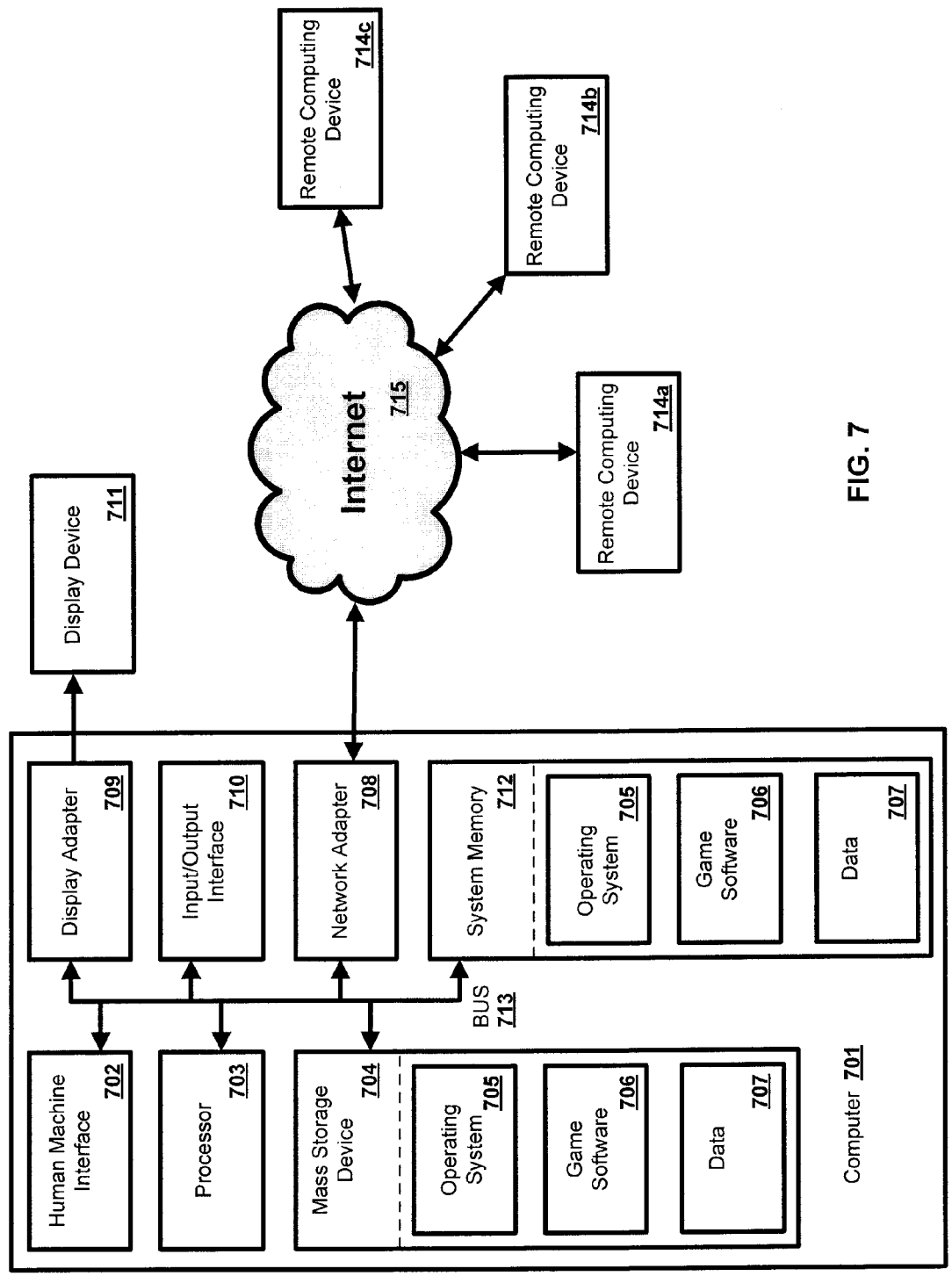
FIG. 7 is a system diagram illustrating an exemplary operating environment in which the method of the present invention can be practiced.

FIG. 7 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 701. The components of the computer 701 can include, but are not limited to, one or more processors or processing units 703, a system memory 712, and a system bus 713 that couples various system components including the processor 703 to the system memory 712.

The system bus 713 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 713, and all buses specified in this description can also be implemented over a wired or wireless network connection and each of the subsystems, including the processor 703, a mass storage device 704, an operating system 705, application software 706, data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically includes a variety of computer readable media. Such media can be any available media that is accessible by the computer 701 and includes both volatile and non-volatile media, removable and non-removable media. The system memory 712 includes computer readable media in the form of volatile memory, such as random access memory (RAM), and/or non-volatile memory, such as read only memory (ROM). The system memory 712 typically contains data such as data 707 and/or program modules such as operating system 705 and application software 706 that are immediately accessible to and/or are presently operated on by the processing unit 703.

The computer 701 may also include other removable/non-removable, volatile/non-volatile computer storage media. By way of example, FIG. 6 illustrates a mass storage device 704 which can provide non-volatile storage of computer code, computer readable instructions, data structures, program modules, and other data for the computer 701. For example, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 704, including by way of example, an operating system 705 and application software 706. Each of the operating system 705 and application software 706 (or some combination thereof) may include elements of the programming and the application software 706. Data 707 can also be stored on the mass storage device 704. Data 704 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 701 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 703 via a human machine interface 702 that is coupled to the system bus 713, but may be connected by other interface and bus structures, such as a parallel port, game port, or a universal serial bus (USB).

A display device 711 can also be connected to the system bus 713 via an interface, such as a display adapter 709. For example, a display device can be a monitor or an LCD (Liquid Crystal Display). In addition to the display device 711, other output peripheral devices can include components such as speakers (not shown) and a printer (not shown) which can be connected to the computer 701 via Input/Output Interface 710.

The computer 701 can operate in a networked environment using logical connections to one or more remote computing devices 714a,b,c. By way of example, a remote computing device can be a personal computer, portable computer, a server, a router, a network computer, a peer device or other common network node, and so on. Logical connections between the computer 701 and a remote computing device 714a,b,c can be made via a local area network (LAN) and a general wide area network (WAN). Such network connections can be through a network adapter 708. A network adapter 708 can be implemented in both wired and wireless environments. Such networking environments are commonplace in offices, enterprise-wide computer networks, intranets, and the Internet 715.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of application software 706 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

VI. EXEMPLARY APPLICATIONS

The disclosed methods can be applicable to computing tasks on the Internet. For example, which tasks should be executed by the (reliable) server and which by the (probabilistically unreliable) workers, so as to minimize the expected computation time. Similarly, the disclosed method can be applied to independent computing tasks on the Internet.

The methods are applicable in grid computing and project management fields. Condor, Thain, D., Tannenbaum, T., Livny, M.: Distributed Computing in Practice: The Condor Experience. Concurrency and Computation: Practice and Experience, Vol. 17, No. 2-4, pages 323-356, February-April, 2005 is an example of a grid system that executes computations with complex task dependencies such as SDSS, Annis, J., Zhao, Y., Voeckler, J., Wilde, M., Kent, S., Foster, I.: Applying Chimera Virtual Data Concepts to Cluster Finding in the Sloan Sky Survey, 15th Conference on High Performance Networking and Computing (SC) (2002) 56, through the DAGMan tool, Condor Manual, Condor Team, University of Wisconsin-Madison http://www.cs.wisc.edu/condor/manual/v6.7/2_11DAGMan_Applications.html (2004). An example of a project management system, wherein the method is applicable, is the Microsoft Project 2003, Microsoft Project 2003 http://www.microsoft.com/office/project/default.asp. The system can estimate project duration using a PERT algorithm based on a probabilistic model of duration of a task, but unconstrained resources.

VII. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

This section describes experiments that evaluate the disclosed method for predicting the running time of the outer loop. Using the least squares method, the time in hours on a 2.8 GHz Intel Pentium 4 processor hardware platform was predicted to be $\gamma \cdot est$, where $\gamma=8.24454 \cdot 10^{-12}$, and est is the value of the estimate for the given problem instance. The accuracy of the method was analyzed. Specifically, the square of the correlation coefficient is more than 0.96.

Figure 8:
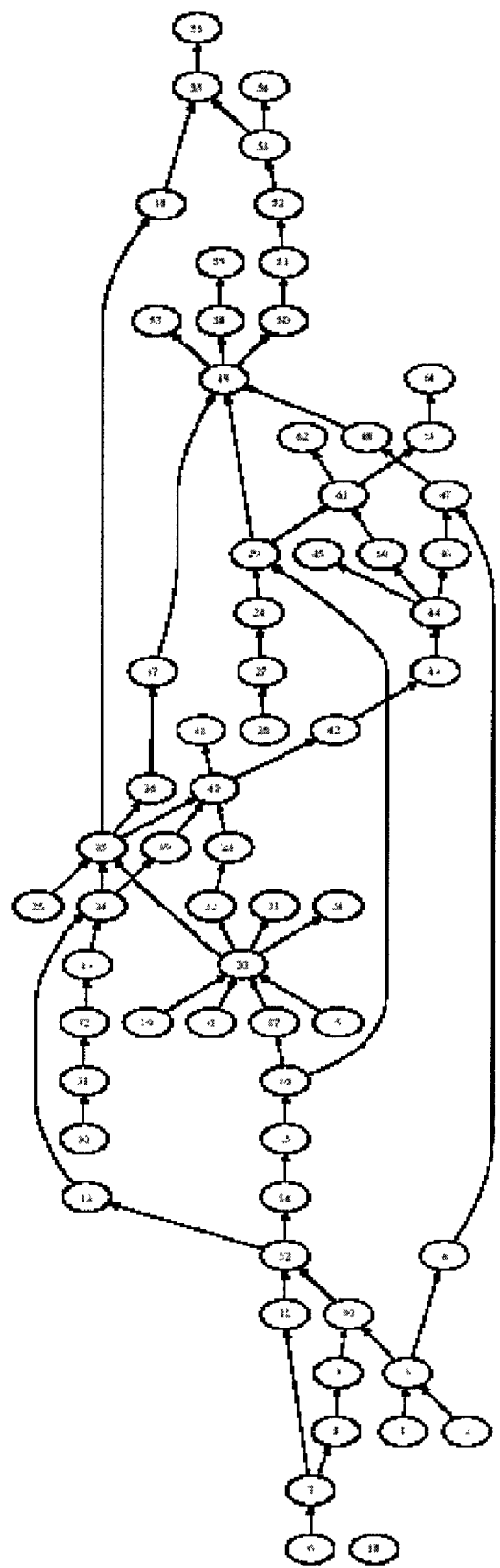
FIG. 8 shows an example of a dag obtained through a process of generating different problem instances to which the method and system of the present invention was applied.

Different problem instances were generated to cover a range of values of dag width and the number of workers. All pairs (w, n) were considered from the set $\{4, 5, 6, 7, 8, 9, 10\}^2$. For a given pair (w, n), problem instances were constructed through a pseudorandom process, so that any instance has a dag of width w and is on n workers. Specifically, 20 problem instances were constructed by selecting w disjoint chains of total length 4 w, 5 w, 6 w, ..., 23 w respectively—the length of each chain is selected pseudorandomly—and identifying nodes of the chains pseudorandomly. FIG. 8 shows an example of a dag obtained through this process. Success probabilities are taken from (0, 1). It took 11 hours to find an optimal regimen for 6 workers on this dag of width 11 with 65 tasks using a computer with a 2.8 GHz Intel Pentium® 4 processor. The probability of success of worker i on task j is $p_{i,j}=1-0.1 \cdot i$. The minimum expected completion time is 27.278 measured in the units of time that an attempt to execute a task takes. An optimal regimen assigns, in the first round, workers to tasks as follows: one to 6, two to 6, three to 2, four to 1, five to 30, six to 1. Note that some eligible tasks are unassigned, while some are assigned redundantly. The admissible evolution of execution has 104, 704 nodes and 11, 454, 563 edges.

The disclosed implementation of OPT was run on each instance. For a given instance, if the graph of admissible evolution of execution was too large, the implementation was stopped. When the graph was sufficiently small, the estimate was computed. If the estimate was larger than $8 \cdot 10^{11}$, which should correspond to more than a few hours of running time, the implementation was stopped on the instance. Otherwise, the outer loop ran and its running time was measured. If the measurement was zero, which meant that the loop took less than one millisecond, the measurement was ignored.

Figure 9:
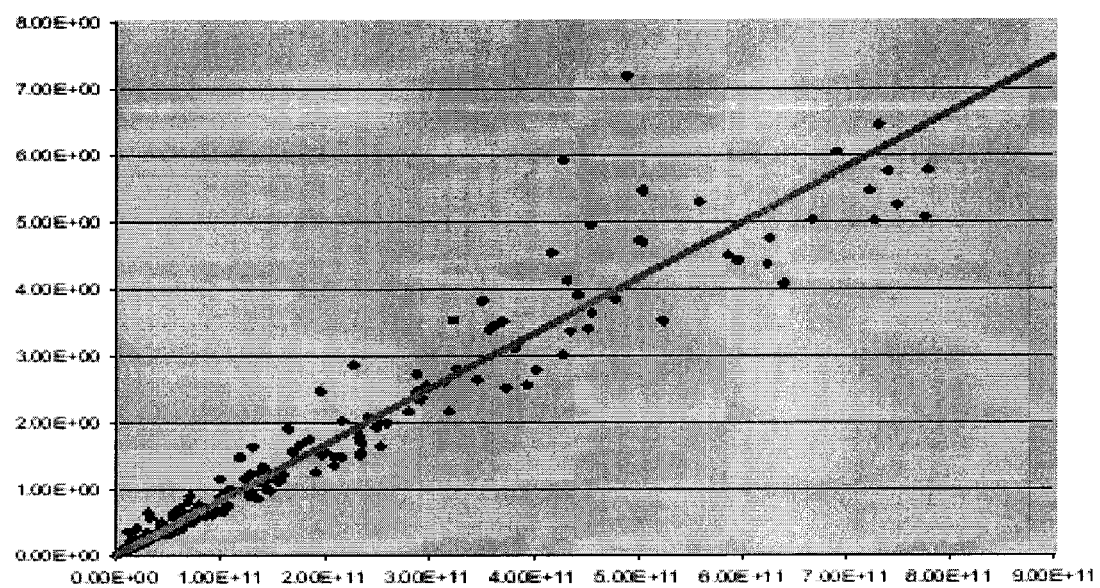
FIG. 9 illustrates the results of an experiment where the running time of the outer loop in hours (vertical) is plotted versus the value of the estimate (horizontal). The least squares line is shown.

693 pairs of the actual running time and estimate were collected, which took over 37 hours on 10 computers of the same type each with a 2.8 GHz Intel Pentium® 4 processor. The pairs are shown in FIG. 9. FIG. 9, shows the results where the running time of the outer loop in hours (vertical) is plotted versus the value of the estimate (horizontal). The least squares line is shown. Using the least squares method (LSM), a line time(est)=$\gamma \cdot$est was "fit" within the points (i.e., do not consider an "additive shift"). Then the slope $\gamma$ found by LSM was $\gamma=8.24454 \cdot 10^{-12}$, and the square of the correlation coefficient was more than 0.96.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for determining an optimal assignment of workers to tasks comprising:
    constructing, using a computer, a topological sort of an admissible evolution of execution for a directed acyclic graph, wherein the directed acyclic graph describes dependencies between tasks and a probability of task completion by each worker; and
    deriving, using the computer, the optimal assignment of workers to tasks at any stage of the execution of the tasks from the topological sort, wherein said optimal assignment is derived by,
        processing a node of an admissible evolution of execution;
        determining a set of eligible tasks for the node;
        determining that there exists an assignment S of workers to the set of eligible tasks that has not been previously considered;
        determining an optimal assignment S of workers to the set of eligible tasks by,
            defining a minimum value of workers and an assignment for each node;
            setting I equal to the set of eligible tasks;
            determining that there is a non-empty subset, D, of the set of eligible tasks I that has not been previously considered;
            determining a probability $a_D$, for each assignment for each respective node, that the non-empty subset, D, is exactly the set of tasks executed by workers in the respective assignment;
            determining, using a recursive equation, an expected completion time;
            determining the probability b that every worker in the assignment S fails to perform an assigned task from the set of eligible tasks;
            determining an average of the expected completions times weighted by the $a_D$'s and b;
            determining a weighted sum with the probabilities $a_D$ and b, and the average of the expected completion times, and the minimum value of workers;
            selecting an assignment that minimizes the weighted sum of workers assigned to eligible tasks;
            setting the minimum value of workers equal to the minimized weighted sum of workers assigned to eligible tasks;
            processing the next node; and
        assigning, using the computer, the optimal assignment S of workers to the tasks.

2. The method of claim 1, wherein constructing, using the computer, a topological sort comprises using the computer for:
    listing subsets of executed tasks in the order of increasing cardinalities of the subsets; and
    using hashing of the subsets and dynamic hash tables to detect duplicate subsets.

3. The method of claim 1, wherein using the recursive equation is conditioned on the fact that the tasks in D become executed and then optimal assignments are used until all tasks have been executed.

4. The method of claim 1, further comprising determining, by the computer, another assignment S if the determined assignment S is not optimal.

5. The method of claim 1, wherein determining that the assignment S is optimal comprises determining that a weighted sum is less than a determined minimum value for the set of eligible tasks.

6. The method of claim 1, further comprising setting, by the computer, an optimal assignment of workers to eligible tasks for every set of executed tasks.

7. A non-transitory computer readable medium having computer executable instructions for performing a method for determining an optimal assignment of workers to tasks comprising:
    constructing a topological sort of an admissible evolution of execution for a directed acyclic graph, wherein the directed acyclic graph describes dependencies between tasks and a probability of task completion by each worker; and
    deriving the optimal assignment of workers to tasks at any stage of the execution of the tasks from the topological sort, wherein deriving the optimal assignment of workers to tasks comprises:
        processing a node of an admissible evolution of execution;
        determining a set of eligible tasks for the node;
        determining that there exists an assignment S of workers to the set of eligible tasks that has not been previously considered;
        determining an optimal assignment S of workers to the set of eligible tasks, wherein determining the optimal assignment S of workers to a set of eligible tasks comprises:
            defining a minimum value of workers and an assignment for each node;
            setting I equal to the set of eligible tasks;
            determining that there is a non-empty subset, D, of the set of eligible tasks I that has not been previously considered;
            determining a probability $a_D$, for each assignment for each respective node, that the non-empty subset, D, is exactly the set of tasks executed by workers in the respective assignment;
            determining, using a recursive equation, an expected completion time;
            determining the probability b that every worker in the assignment S fails to perform an assigned task from the set of eligible tasks;
            determining an average of the expected completions times weighted by the $a_D$'s and b;
            determining a weighted sum with the probabilities $a_D$ and b, and the average of the expected completion times, and the minimum value of workers;
            selecting an assignment that minimizes the weighted sum of workers assigned to eligible tasks;
            setting the minimum value of workers equal to the minimized weighted sum of workers assigned to eligible tasks;
            processing the next node; and
        assigning the optimal assignment S of workers to the tasks.

8. The computer readable medium of claim 7, wherein constructing a topological sort comprises:
listing subsets of executed tasks in the order of increasing cardinalities of the subsets; and
using hashing of the subsets and dynamic hash tables to detect duplicate subsets.

9. The computer readable medium of claim 7, wherein using the recursive equation is conditioned on the fact that the tasks in D become executed and then optimal assignments are used until all tasks have been executed.

10. The computer readable medium of claim 7, further comprising determining another assignment S if the determined assignment S is not optimal.

11. The computer readable medium of claim 7, wherein determining that the assignment S is optimal comprises determining that a weighted sum is less than a determined minimum value for the set of eligible tasks.

12. The computer readable medium of claim 7, further comprising setting an optimal assignment of workers to eligible tasks for every set of executed tasks.

13. A system for determining an optimal assignment of workers to tasks comprising:
a computer, said computer comprising a memory, wherein said memory contains computer-executable code, and a processor operably connected to said memory, wherein said processor is configured to execute said computer-executable code to perform the steps of:
constructing a topological sort of an admissible evolution of execution for a directed acyclic graph, wherein the directed acyclic graph describes dependencies between tasks and a probability of task completion by each worker;
deriving the optimal assignment of workers to tasks at any stage of the execution of the tasks from the topological sort, wherein said optimal assignment is derived by,
processing a node of an admissible evolution of execution;
determining a set of eligible tasks for the node;
determining that there exists an assignment S of workers to the set of eligible tasks that has not been previously considered; and
determining an optimal assignment S of workers to the set of eligible tasks by,
defining a minimum value of workers and an assignment for each node;
setting I equal to the set of eligible tasks;
determining that there is a non-empty subset, D, of the set of eligible tasks I that has not been previously considered;
determining a probability $a_D$, for each assignment for each respective node, that the non-empty subset, D, is exactly the set of tasks executed by workers in the respective assignment;
determining, using a recursive equation, an expected completion time;
determining the probability b that every worker in the assignment S fails to perform an assigned task from the set of eligible tasks;
determining an average of the expected completions times weighted by the $a_D$'s and b;
determining a weighted sum with the probabilities $a_D$ and b, and the average of the expected completion times, and the minimum value of workers;
selecting an assignment that minimizes the weighted sum of workers assigned to eligible tasks;
setting the minimum value of workers equal to the minimized weighted sum of workers assigned to eligible tasks;
processing the next node; and
assigning the optimal assignment S of workers to the tasks.

14. The system of claim 13, wherein constructing a topological sort comprises:
listing subsets of executed tasks in the order of increasing cardinalities of the subsets; and
using hashing of the subsets and dynamic hash tables to detect duplicate subsets.

15. The system of claim 13, wherein using the recursive equation is conditioned on the fact that the tasks in D become executed and then optimal assignments are used until all tasks have been executed.

16. The system of claim 13, further comprising determining another assignment S if the determined assignment S is not optimal.

17. The system of claim 13, wherein determining that the assignment S is optimal comprises determining that a weighted sum is less than a determined minimum value for the set of eligible tasks.

18. The system of claim 13, further comprising setting an optimal assignment of workers to eligible tasks for every set of executed tasks.

* * * * *